US009639534B2

(12) United States Patent
Canora et al.

(10) Patent No.: US 9,639,534 B2
(45) Date of Patent: *May 2, 2017

(54) SYSTEM AND METHOD FOR AUTOMATING THE CREATION OF CUSTOMIZED MEDIA

(75) Inventors: David Canora, Winter Garden, FL (US); Michael Colglazier, Orlando, FL (US); Michael J. Gomes, Windermere, FL (US); Beth Patterson, Celebration, FL (US); Robert A. Swirsky, Sunnyvale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1687 days.

This patent is subject to a terminal disclaimer.

(21) Appl. No.: 12/206,922

(22) Filed: Sep. 9, 2008

(65) Prior Publication Data

US 2010/0076967 A1 Mar. 25, 2010

Related U.S. Application Data

(63) Continuation-in-part of application No. 11/204,908, filed on Aug. 15, 2005, now Pat. No. 8,201,073.

(51) Int. Cl.
*G06F 17/30* (2006.01)
*G06F 7/00* (2006.01)

(52) U.S. Cl.
CPC .. *G06F 17/30041* (2013.01); *G06F 17/30044* (2013.01); *G06F 17/30056* (2013.01)

(58) Field of Classification Search
None
See application file for complete search history.

(56) References Cited

U.S. PATENT DOCUMENTS

| | | | |
|---|---|---|---|
| 2001/0041020 A1* | 11/2001 | Shaffer et al. | 382/305 |
| 2004/0027369 A1* | 2/2004 | Kellock et al. | 345/716 |
| 2004/0120009 A1* | 6/2004 | White et al. | 358/1.18 |
| 2004/0249859 A1* | 12/2004 | Ward et al. | 707/104.1 |
| 2004/0250205 A1* | 12/2004 | Conning | 715/517 |
| 2007/0038938 A1* | 2/2007 | Canora et al. | 715/731 |

* cited by examiner

*Primary Examiner* — Usmaan Saeed
*Assistant Examiner* — Yu Zhao
(74) *Attorney, Agent, or Firm* — Ference & Associates LLC

(57) ABSTRACT

A system and method for automating the creation of customized media includes generating media content comprising first metadata associated with the media content, reviewing the media content and the first metadata, applying at least one set of rules to the media content and the first metadata, and generating a customized media output based on the media content, the first metadata and the at least one set of rules.

14 Claims, 5 Drawing Sheets

SYSTEM AND METHOD FOR AUTOMATING THE CREATION OF CUSTOMIZED MEDIA

CROSS-REFERENCE TO RELATED APPLICATION

This application is a continuation-in-part (CIP) of copending, commonly assigned U.S. patent application Ser. No. 11/204,908, filed on Aug. 15, 2005, entitled "System And Method For Automating the Creation of Customized Media Content."

BACKGROUND

The availability of digital media content has continued to increase. Examples of digital media include digital image files, digital video files, digital audio files, and a number of other types of media. Often, data in addition to the media content is appended to, prepended to, prefixed to, stored with, or otherwise associated with the media content. As a basic example, the date and time that an image is captured is often associated with an image file that is captured with a digital camera. The date and time information is stored along with the image file on a memory device associated with the digital camera. This additional data is generally referred to as "metadata." Alternatively, the metadata can be stored in a database that can be associated with the media content using a unique identifier. Metadata provides information relating to and about the media content in addition to the media content itself.

One of the benefits of digital media, such as a digital image file, is the ease with which the digital image file can be stored and manipulated. For example, it is common to electronically store, transfer, access and view the digital image file using, for example, a computer or other viewing device or appliance.

An existing use of digital media is the creation of a customized, or personalized, digital video disk (DVD), on which a number of digital image files are combined with generalized image and video files to create a customized DVD to commemorate an event or other occurrence. For example, U.S. Patent Application Publication No. 2007/0038938, discloses a system and method for combining digital media files taken at an amusement park, or other venue, with preexisting digital media files to create a DVD commemorating a visit to a theme park. The DVD is created by using digital media files identified by a user, combining the user identified media files with predefined content, and applying rules to generate a customized DVD.

However, it would be desirable to have additional parameters with which to generate customized media in any format.

SUMMARY

Embodiments of the invention include a method for automating the creation of customized media, comprising generating media content comprising first metadata associated with the media content, reviewing the media content and the first metadata, applying at least one set of rules to the media content and the first metadata, and generating a customized media output based on the media content, the first metadata and the at least one set of rules.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1:
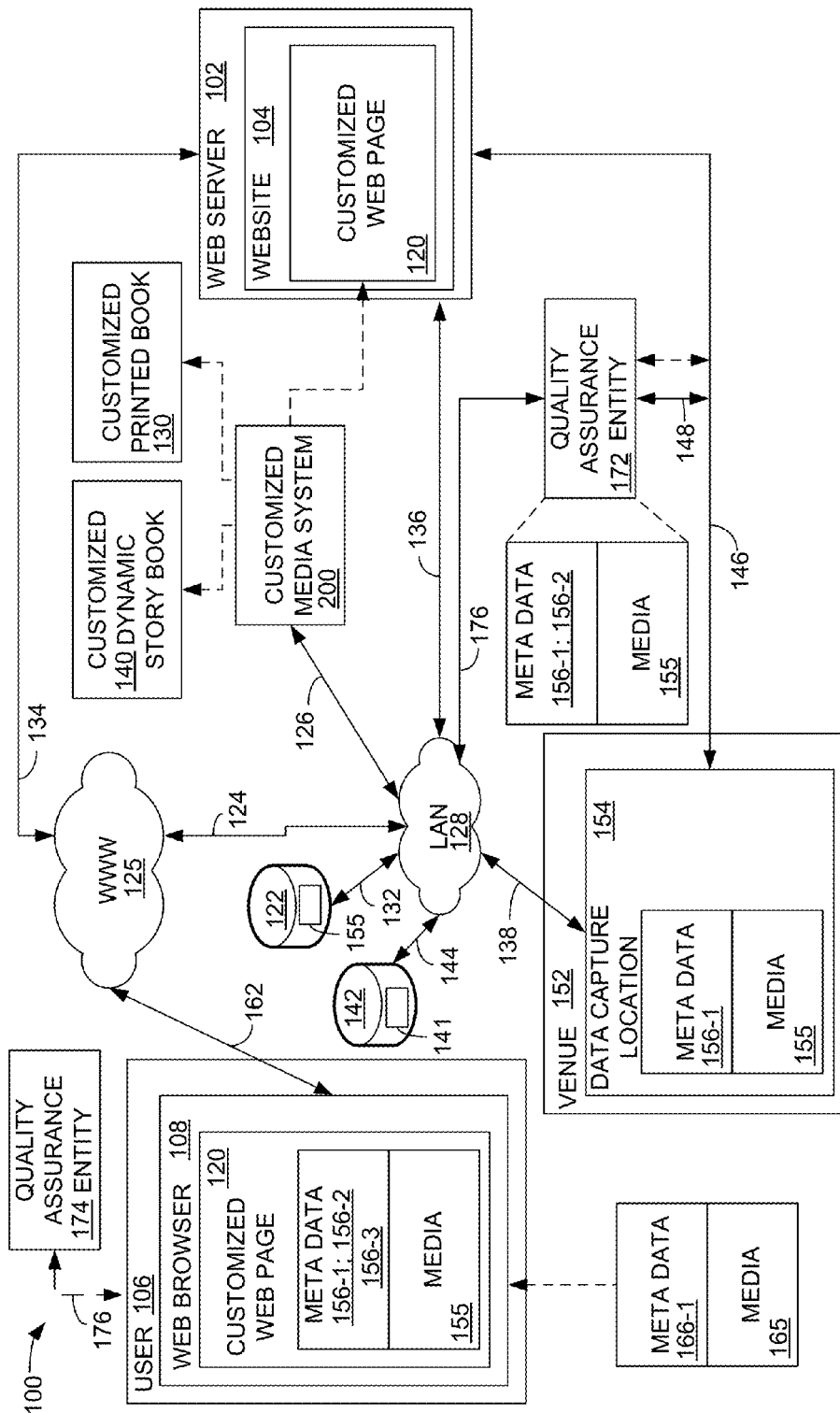
FIG. 1 is a block diagram illustrating an example of an implementation of a system for automating the creation of customized media.

The system and method for automating the creation of customized media will be described primarily in the context of generating a customized photo-sharing website. However, the system and method for automating the creation of customized media is applicable to generating other customized media, other products that include customized media, and any type of customized media based on metadata associated with the media. The metadata associated with the media can be applied to the media when the media is created, or can be added to the media after the media is created. Further, the metadata can be added to the media automatically through the operation of one or more automated systems, or can be added manually by a user or by an administrator of the system.

The system and method for automating the creation of customized media can be implemented in hardware, software, or a combination of hardware and software. When implemented in hardware, the system and method for automating the creation of customized media can be implemented using specialized hardware elements and logic. When the system and method for automating the creation of customized media is implemented in software, the software can be used to control the various components in a system and network associated with the program. The software can be stored in a memory and executed by a suitable instruction execution system (microprocessor). The hardware implementation of the system and method for automating the creation of customized media can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for automating the creation of customized media comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

In the description to follow, the terms "media," "media content," "content," "digital content," and "digital media content" refer to content that can have metadata associated with it and that can be electronically stored. An example of digital media content is a digital image file generated by a digital still camera or by a digital video camera. Other types of digital content, such as audio files, or other files are contemplated.

The term "metadata" as used herein describes data that can be stored with, appended to, or otherwise associated with media content. A non-limiting example of metadata is the date and time that a digital image is captured by a digital still camera. Metadata is not limited to data that can be applied by the device (in this example, the digital still camera) that captures an image. Metadata can include data added to or otherwise associated with media content after the content is created and stored.

FIG. 1 is a block diagram illustrating an example of an implementation of a system for automating the creation of customized media. The implementation 100 illustrates a number of components and systems that can be connected over one or more networks. However, the system and method for automating the creation of customized media can be implemented in other ways. For example, the system and method for automating the creation of customized media can be implemented at a single location. The implementation shown in FIG. 1 includes a web server 102 coupled to a network 125 over connection 134 and to a network 128 over connection 136. In an embodiment, the network 125 can be a public network, such as a wide area network (WAN), such as the world wide web (WWW), and the network 128 can be a private network, such as a local area network (LAN), such as a wireless or wired local network. In an embodiment, the network 128 can be a wireless network that can be implemented in, for example, an amusement park, a shopping mall, a stadium or other sports venue, or the like. The network 128 can be coupled to the network 125 over connection 124 and can also comprise a combination of a wireless network and a wired network, such as, for example, a network operated by a corporate entity or the like. The connections 134 and 136 can be any known wireless or wired connections for connecting to the networks 125 and 128, respectively.

The implementation 100 also includes venue 152 connected to the network 128. In an embodiment, the venue 152 can be an amusement park, a shopping mall, a sports or entertainment arena, or any other venue. The venue 152 is connected to the network 128 over connection 138. The connection 138 can be any wired or wireless connection as known in the art. In an embodiment, the venue 152 can be an amusement park having a data capture location 154. For example, a data capture location 154 can be a site within an amusement park at which a photographer captures electronic photographs of guests. In an embodiment in which the data capture location 154 is a site for photography, media 155 is captured. In an embodiment, the media 155 can be a photograph, an image file, an audio file, or any other media. Further, while shown as a single element, the media 155 can also include a plurality of media elements. For example, the media 155 may include a collection of digital photographs, or other media elements. In an embodiment, the media 155 includes metadata, which will be referred to generally as metadata 156. However, depending on the source of the metadata 156, the metadata 156 will also be referred to as 156-1, 156-2, 156-3, etc.

The customized media system 200 provides customized media output based on, for example, the media 155 and the metadata 156 associated with the media 155. In an example, the media 155 can be a photograph taken at, for example, an amusement park by an employee-photographer of the amusement park. Typically, the photographer logs in to the network 128. By logging in to the network 128, the location in the venue 152 at which the photographer is taking photographs is known. In addition, when a photograph is captured, a certain amount of metadata is added to the captured data. For example, the date, time, location at the venue where the photograph is taken, and other metadata, can be added to the captured photograph. In addition, other metadata, such as whether any characters were present in the photograph, can also be added, or otherwise associated with the data, when the data is captured.

The metadata of 156-1 can be any metadata that is associated with the media 155. In an example in which the media 155 is a photograph, the meta data 156-1 can be, for example, the date and time that the photograph was captured, the location within the venue 152 at which the media was captured, the global positioning system (GPS) coordinates within the venue 152 at which the photograph was captured, or any other metadata that can be applied to the media 155 at the data capture location 154. Alternatively, metadata such as GPS data can be associated with the media 155 at a later time. For example, in the case of a photograph, GPS metadata can be induced from information available at the time of image capture from, for example, the identity of a nearby communications tower (e.g., cell tower) or a WiFi beacon received, by the image capture device.

After the media 155 and the associated metadata 156-1 are captured, the media 155 and the associated metadata 156-1 are provided via the network 128 to a media content store 122. The media content store 122 is connected to the network 128 via connection 132. In an embodiment, the media content store 122 can be an electronic storage device, such as a server computer having a storage device, or another storage device connected to the network 128. In an embodiment, a predefined content store 142 is also connected to the network 128 over connection 144. The predefined content store 142 can store, for example, predefined media content 141 such as image files, video files, audio files, etc. The connections 132 and 144 can be any wired or wireless connections similar to the connection 138. The media content store 122 stores the media and associated metadata provided from the venue 152.

The implementation 100 also includes a customized media system 200. The customized media system 200, embodiments of which will be explained in greater detail below, is connected to the network 128 over connection 126. In an embodiment, the customized media system 200 includes logic and processing functionality that can generate and provide a customized media output. For example, in an embodiment, the customized media system 200 operates on the media 155 and associated metadata 156-1 and 156-2, to generate a customized webpage 120. The customized webpage 120 can be part of a website 104 provided by the web server 102. It should be understood that the customized webpage 120 may include a number of web pages associated with the website 104.

In alternative embodiments, the customized media system 200 can provide other customized media output. For example, the customized media system 200 can provide a customized printed book 130, a customized dynamic storybook 140, or any other customized media output. As used herein, a customized printed book 130 can be a paper book that is generated by hardware and software associated with the customized media system 200, where the contents of the customized printed book 130 are generated by combining the media 155, the associated metadata 156, predefined content 141 from the predefined content store 142, or any other media and metadata to provide a customized printed book 130.

Similarly, the customized dynamic storybook 140 can be a paper book, or a video file, that is generated by hardware and software associated with the customized media system 200, where the contents of the customized dynamic storybook 140 are generated by combining the media 155, the associated metadata 156, predefined content 141 from the predefined content store 142, along with specific instructions to create a dynamic, or personalized, story associated with the media 155.

In an example, the media 155 and associated metadata 156-1 are reviewed by a reviewing entity, such as a quality assurance entity 172. The quality assurance entity 172 can be, for example, an automated system or process running on a computing device, can be a human that manually views and analyzes the media 155, or can be a combination of an automated system or process and a human. Further, the quality assurance entity can be an administrator of the customized media system 200, or can be a user. The quality assurance entity 172 is illustrated as being coupled to the connection 146 over connection 148. In this illustrative example, the connection 146 is intended to show a physical connection between the data capture location 154 and the web server 102. However, it should be understood that the media 155 and the associated metadata 156-1 can be provided to the web server 102 via the network 128 and connections 138 and 136. The connection 148 can be any wired or wireless connection, over which the quality assurance entity 172 can access the media 155 and the associated metadata 156-1. In another embodiment, the quality assurance entity 172 can access the media 155 and the metadata 156 in the media content store 122 via the network 128 and connections 176 and 132. The connection 176 can be any wired or wireless connection that enables the quality assurance entity 172 to access the network 128.

In an embodiment, the quality assurance entity 172 reviews, analyzes, or otherwise observes the media 155 and the metadata 156-1. After review, the quality assurance entity 172 can reach certain conclusions based on the review. For example, the quality assurance entity 172 can determine whether there is a common theme for a number of photographs for a particular family. After reviewing the media 155 and the metadata 156-1, the quality assurance entity 172 can provide additional metadata, which is illustrated as metadata 156-2. In FIG. 1, the metadata associated with the quality assurance entity 172 is illustrated as 156-1(2), to illustrate that the quality assurance entity 172 adds metadata 156-2 in addition to the metadata 156-1 that was added to the media 155 at the data capture location 154. As will be described more fully below, all of the available metadata, whether obtained at the time the data was captured, or whether added at a later time by an automated process or by a human, are acted on by business rules to create the customized media output.

The implementation 100 also includes a user 106 connected to the network 125 over connection 162. The user 106 illustrates any user of a wide-area network such as the World Wide Web. The connection 162 can be any wired or wireless connection over which a user 106 implements a web browser of 108 to exchange information over the network 125. In an embodiment, the user 106 can be an individual that is attempting to view the website 104. In this example, the customized webpage 120 is illustrated as being displayed to the user 106 through the web browser 108. In this example, the media 155 and the associated metadata is shown as part of the customized webpage 120. However, it should be understood that the content and the images provided via customized webpage 120 would be those provided by the customized media system 200 as described above. In this example, the user 106 can access the media 155 and the metadata 156 associated with the media 155 to review and, if desired, add additional metadata. For example, the metadata shown within the customized webpage 120 within the web browser 108 includes metadata 156-1(2)(3), to illustrate that the user added metadata is the metadata 156-3. As described above, the metadata 156-1 was added at the data capture location 154, the metadata 156-2 was added by the quality assurance entity 172, and the metadata 156-3 is added by the user 106.

In this example, the user 106 acts as a quality assurance entity 174. The quality assurance entity 174 is shown as connected to the user 106 over a dotted line 176 to illustrate that user 106 is acting as the quality assurance entity 174. In another exemplary embodiment, the user 106 can add their own media and associated metadata. This is illustrated as media 165 which includes associated metadata 166-1. In this example, and for illustration purposes only, the user 106 can add their own photographs, audio files, image files, or any other media 165 to the customized webpage 120. The user-added media 165 includes user-added metadata 166-1. As described above, business rules can be applied to the metadata 166-1 to develop the customized media output.

Figure 2:
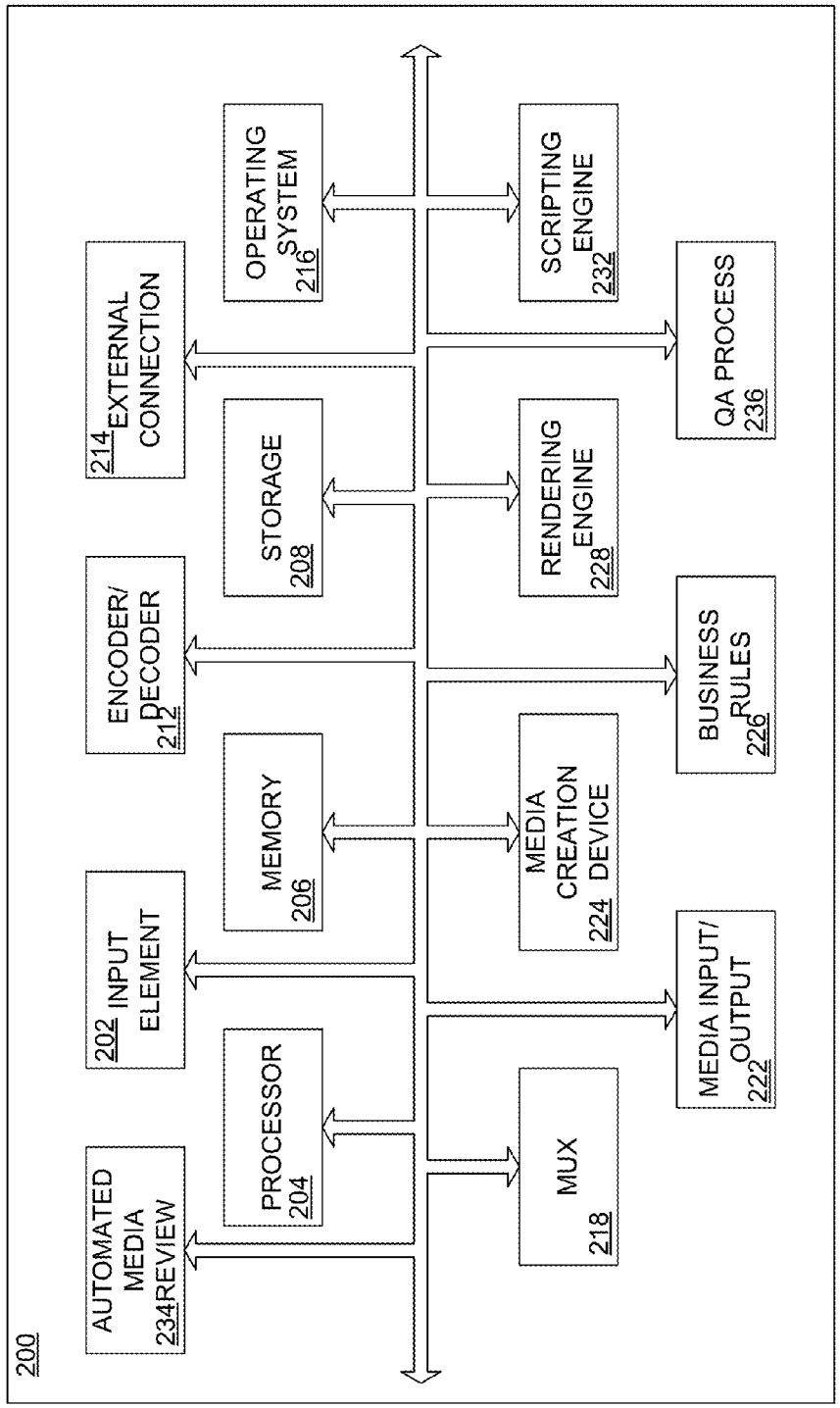
FIG. 2 is a block diagram illustrating an example of a system for automating the creation of customized media that can be implemented in the system of FIG. 1.

FIG. 2 is a block diagram illustrating an example of a system for automating the creation of customized media that can be implemented in FIG. 1. In an embodiment, the system for automating the creation of customized media is implemented using the customized media system 200. The customized media system 200 includes electrically connected hardware elements including an input element 202, a processor 204, a memory 206, a storage 208, an encoder/decoder 212, an operating system 216, a multiplexer 218, a media input/output (I/O) element 222, a media creation device 224, a business rules engine 226, a rendering engine 228, a scripting engine 232, an automated media review element 234 and an external connection 214, which can be a connection to an external source. In an embodiment, the media I/O element 222 can be configured to operate on any type of media, such as, for example, an image file, a video file, an audio file, or any other media file.

Several variations of the system for automating the creation of customized media are contemplated and within the intended scope of this disclosure. For example, given processor and computer performance variations and ongoing technological advancements, hardware elements, such as encoder/decoder 212, may be embodied in software or in a combination of hardware and software. Similarly, software elements, such as multiplexer 218, may be embodied in hardware or in a combination of hardware and software.

In an embodiment, the customized media system 200 is connected to other devices, the Internet or networks (including but not limited to local area networks, wide area networks and the internet) through the external connection 214. The external connection 214 may be wired, wireless and/or another type of connection to other computing devices or networks. The external connection 214 further allows various components of the customized media system 200 to reside in locations which are remote from each other and are connected through a wired, wireless or other type of connection. For example, most of the components of the customized media system 200 may be located on a server, such as the media server 108 of FIG. 1, while the input element 202 may be remotely located from the server and may comprise a graphical user interface (GUI) or a personal computer having an internet-delivered user interface. This would enable a user to access a website through the internet from the user's home or other location to provide the user-selected content and metadata to include in the customized media output.

In another embodiment, the customized media system 200 can be a stand-alone device located within a user's home, such a self-contained unit or can be contained entirely in software and hardware residing within a personal computer, or can be located outside the user's home, such as residing in a multimedia kiosk, retail store, photo studio or other business venue.

The input element 202 can comprise any number of devices and/or device types for receiving input. In an embodiment, the customized media system 200 includes a media input/output element 222 for providing or acquiring media content, such as an image, video, audio, or any other media content. Such I/O devices may include an input port, CD drive, a DVD-ROM drive, a flash card or memory card reader, a floppy disk drive, a microphone, a wireless port, a fixed or portable database and the like.

In an embodiment, a media creation device 224 is provided for producing a customized media output, also referred to as a product, containing customized media content, where the media creation device 224 may comprise a web server for generating a website, a CD/DVD/Blu-Ray™ disc writer for the creation of a multimedia enabled disc, a USB memory device or other type of port or device for storing the customized media content as an electronic file on a media, a printer for printing a customized printed book or a customized dynamic story book, or any other customized media.

The media I/O element 222 can be configured to access images from various sources, including digital images taken with a digital camera, images recorded on photographic film and then scanned and converted to digital format, digital images stored on a storage device or portable memory device, or images stored in an image database. In one embodiment, the image database may include theme-specific images, for example images from a theme park, cruise, tourist attraction, special event, etc. The images can still further include graphics and animations. Images may alternatively be acquired from other sources available by means of the external connection 30 or other connections. Examples of image formats for images supplied by image I/O 22 can include, but are not limited to, BMP, DCS, DIB, EXIF, FlashPix, IMPS, JPEG, JPEG 2000, PhotoCD, PPM, TIFF, and Raw image formats.

The media I/O element 222 can similarly be configured to provide video from various sources, such as through an input port for connecting to a camera for downloading video taken by a user or for connecting portable memory thereto. Video can also be provided by accessing video stored in a video database comprising prerecorded video or containing a plurality of video clips. In one embodiment, the video can be theme-specific, for example scenes from an amusement park, cruise, tourist attraction, special events, etc. The media I/O element 222 also allows a user to provide personally composed video compositions. Video may alternatively be supplied from other sources available by means of the external connection 214 or other connections. Examples of video formats for video supplied by the media I/O element 222 can include, but are not limited to, Windows Media Video (WMV), MPEG-1, MPEG-2, MPEG-4, H.261, H.262, H.263, CCIR 601 (digital video standard), AVI (MS Windows media format), Quicktime, DV (from digital video camcorders), and real video (Real Network).

The media I/O element 222 can similarly be configured to provide audio from various sources, such as through an input port for connecting to a microphone, a recording device for downloading audio or music information recorded by a user, or a portable memory device. Audio information can also be provided by accessing audio information stored in an audio database comprising prerecorded audio clips or music. In one embodiment, the audio information may be theme-specific, for example music or audio associated with characters, people, movies, events, amusement parks, tourist attractions, sports venues, etc. The audio I/O may further allow a user to provide personally composed audio or musical compositions. Audio information may alternatively be supplied from other sources available by means of the external connection 30 or other connections. The media I/O element 222 can allow a user to annotate their images or video with an associated speech file (e.g., a .wav file). Examples of audio formats for audio information supplied by media I/O element 222 can include, but are not limited to, Windows Media Audio (WMA), Wave file, MP3, Music CD audio, Apple/SGI formats (.AIFF, .AIF), Sun audio (.AU), and Creative Lab format (.VOC).

The automated media review element 234 can be an automated process that may include hardware, software, or a combination of hardware and software. In an embodiment, the automated media review element 234 can be used to automatically review and analyze the media 155 and the metadata 156. In such an embodiment, the automated media review element 234 can perform at least a portion of the function of the quality assurance entity 172 described above.

The business rules engine 226 can contain one or more predefined or dynamic sets of instructions, referred to as business rules, which can be accessed by the automated media review element 234 and the scripting engine 232, and be implemented, or executed, by the processor 204. In an embodiment, the automated media review element 234 applies the business rules in the business rules engine 226 to add metadata to media. The scripting engine 232 applies business rules in the business rules engine 226 to customize the script that the rendering engine 228 uses to create the customized media output.

The above-mentioned methods of adding metadata 156 to media 155, whether at capture, by quality assurance review, by user, or by operation of the automated media review element 234, provide a richer "input" into the business rules engine 226. The presence of the metadata 156 allows the business rules engine 226 to more intelligently customize the script created by the scripting engine 232 so that the customized media rendered by the rendering engine 228 and produced by the media creation device 224 is customized based on the media 155 and the metadata 156. The system and method for automating the creation of customized media provides for customizing "products" such as website and books.

Figure 3:
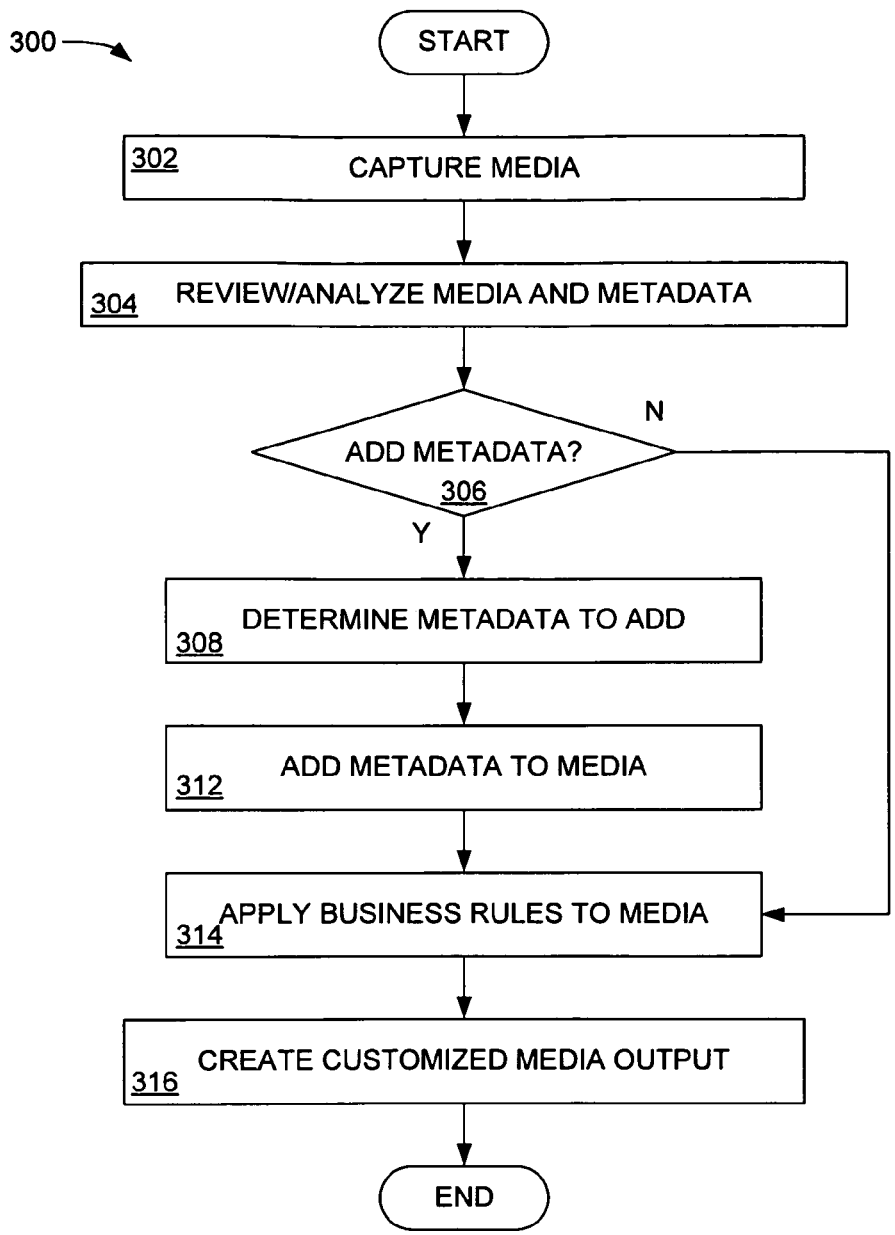
FIG. 3 is a flowchart describing the operation of an embodiment of a method for automating the creation of customized media.

FIG. 3 is a flowchart 300 describing the operation of an embodiment of a method for automating the creation of customized media. In block 302, media 155 is captured. For example, a photograph, or more likely, a series of photographs, can be captured at an amusement park. In block 304, the media 155 and the metadata 156 is reviewed and analyzed. As described above, the media 155 can be reviewed and analyzed by an individual, by an automated system, or by a combination of these. In an embodiment, an automated system, such as the automated media review element 234 (FIG. 2), can review the media 155 and the metadata 156 associated with the media. For example, the automated media review element 234 can review a collection of photographs to determine whether a common theme exists for the photographs. A common theme can be any criteria that associates the media 155 with a particular category or theme. For example, if a number of photographs taken at an amusement park include a particular character, then a common theme might be generated to include that particular character. Alternatively, a quality assurance entity other than an automated system or process can review the media 155 and the metadata 156. For example, an employee of an entity that administers the customized media system 200, or a user of the customized media system 200, can review and analyze the media 155 and the metadata 156 to determine whether additional metadata should be added.

In block 306, it is determined whether additional metadata should be added to the media 155. If it is determined that additional metadata should not be added, then, the process proceeds to block 314 where business rules in the business rules engine 226 are applied to the media.

If, however, in block 306 it is determined that additional metadata should be added to the media 155, then, in block 308 it is determined what metadata to add. In an example, the quality assurance process 236 can, in conjunction with the automated media review element 234, review the media 155 and determine what metadata, if any, to add. In an example, if the automated media review element 234 determines that a common theme exists with the media 155, then, additional metadata 156-2 can be added that identifies the common theme associated with the media 155. Alternatively, a quality assurance entity other than an automated system or process can review the media 155 and the metadata 156, and determine what additional metadata to add to the media 155. For example, a user may review the media 155 and determine that they would like a particular theme applied to the media 155.

In block 312, the additional metadata is added to the media. In block 314, business rules in the business rules engine 226 are applied to the media. The business rules can be, for example, any set of rules or instructions that can be used to intelligently customize the script created by the scripting engine 232 so that the customized media rendered by the rendering engine 228 and produced by the media creation device 224 is highly customized. As a non-limiting example, if n % of photographs have metadata identifying a particular character or characters in them, then a "character theme" will be applied to the photographs. Otherwise a generic theme will be applied. As another non-limiting example, if n or more photographs have location metadata identifying them as being taken at a particular location or venue, then a multi-photo layout will be applied, and that layout will be themed to the character or characters identified by the metadata. A customized media output is created in block 316 and can be the customized web page 120 that includes a particular theme based on the metadata 156 associated with the media 155.

Figure 4:
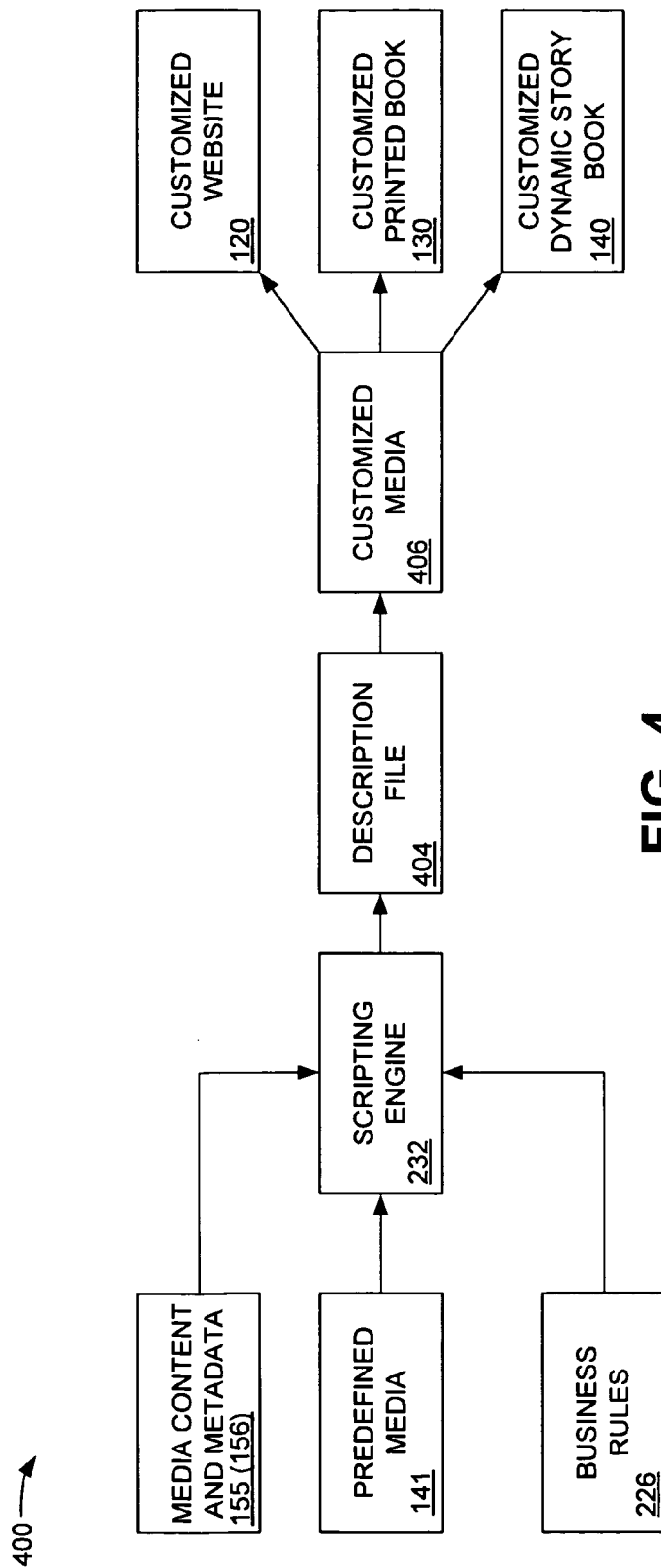
FIG. 4 illustrates a flow diagram for an embodiment of the system and method for automating the creation of customized media in which a scripting engine generates a script for the customized media output.

FIG. 4 illustrates a flow diagram 400 for an embodiment of the system and method for automating the creation of customized media in which a scripting engine generates a script for the customized media output. The scripting engine 232 utilizes the business rules in the business rules engine 226, the media 155, the metadata 156 and the predefined media content 141 as inputs to generate the customized media output 406. The scripting engine 232 generates the script in the form of a description file 404 that is used by the rendering engine 228 (FIG. 2) to generate the customized media output 406. If the customized media output 406 is a web page, such as the customized web page 120, the customized media output can be provided in a format that can be rendered by the web server 102 as a web site 104. Alternatively, the description file 404 can be provided in any format appropriate for the customized media output The media 155 and the metadata 156 associated with the media 155 affects how the business rules in the business rules engine 226 generate the instructions (or "script") in the description file 404 used by the rendering engine 228 to construct the final customized output.

In an embodiment, the scripting engine 232 can utilize the business rules in the business rules engine 226 to determine the predefined media content 141 that is included in a given segment of the customized media output either: 1) explicitly based on the particular content selected by the user (e.g., the user chooses to include media having a specific theme or folder, such a "Magic Kingdom" chapter, and the predefined media content 141 would be selected to match such a specific theme), or 2) implicitly based on the media selected by the user (e.g., the number of images chosen by a user could define the length of the customized media output or could define the number of additional predefined images to combine with the selected images, such that a larger number of user-selected images may result in a longer segment and/or a different number of predefined stock images being included).

In another embodiment, the scripting engine 232 can also utilize the business rules in the business rules engine 226 to determine when the media 155 is displayed based on either: 1) a desired choreography or arrangement (e.g., images or photos are choreographed to be displayed based on the particular predefined content 141 to be displayed in a background segment), or 2) information about the media (e.g., a photo taken at a particular location will be shown while predetermined media content 141 of scenes of the particular location are shown as a background segment).

In yet another alternative embodiment, the scripting engine 232 can further utilize the business rules 226 to determine how the media 155 is displayed by affecting any of the following: 1) how the media content and predetermined content transitions within the scripted customized media output (e.g., the particular motion path an image moves across the screen, such as sliding left to right or zooming in from center, etc.), 2) the graphical borders displayed around content (e.g., based on what predefined media content is being shown in the background segment with the media 155), 3) how media 155 is to be rendered with the predefined content, 4) how the media 155 is to be situated (i.e., overlaid or underlaid) with respect to the predetermined media content 141, 5) the Chroma key "green screen" effect of the media 155, and 6) the order in which the segments of the customized media output are assembled.

Figure 5:
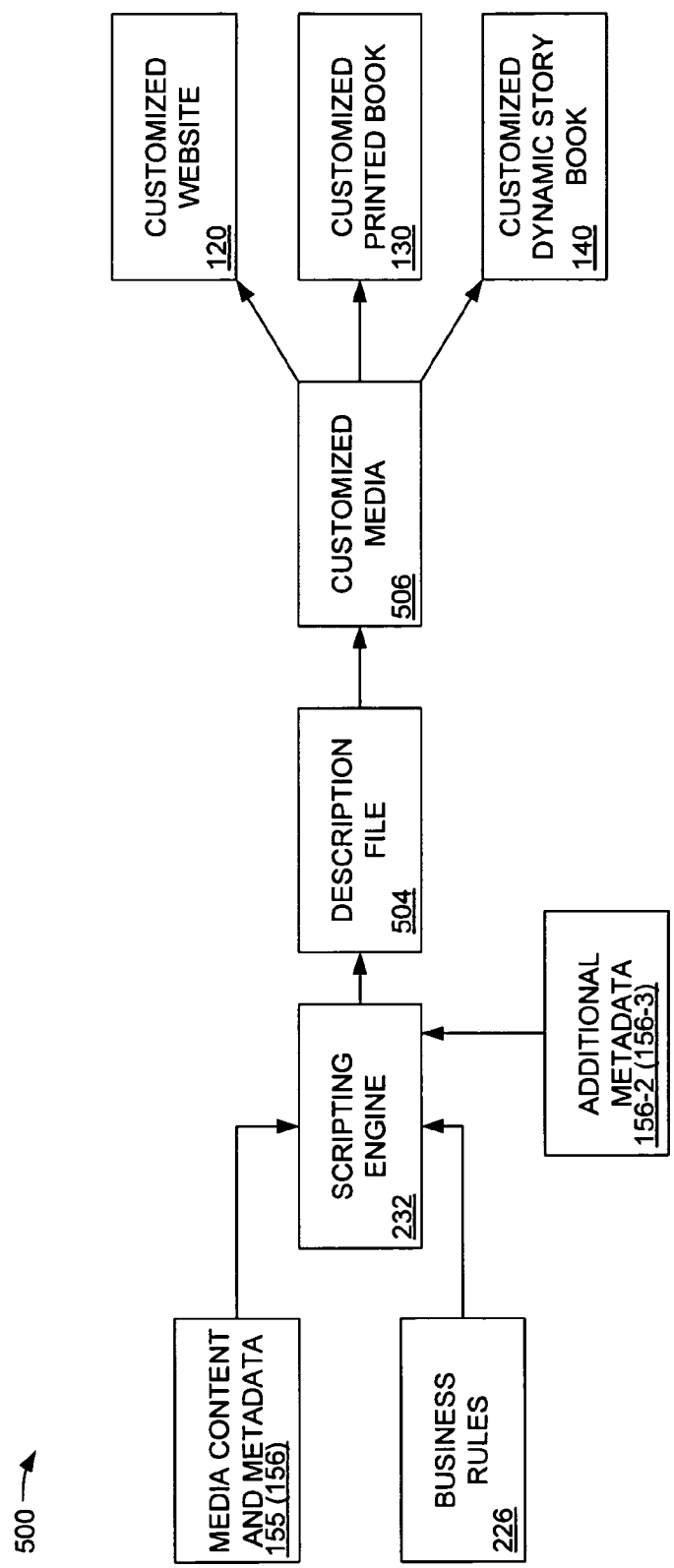
FIG. 5 illustrates a flow diagram for an embodiment of the system and method for automating the creation of customized media in which a scripting engine generates a script for the customized media output utilizing additional metadata.

FIG. 5 illustrates a flow diagram 500 for an embodiment of the system and method for automating the creation of customized media in which a scripting engine generates a script for the customized media output utilizing additional metadata. In an embodiment, the scripting engine 232 utilizes the business rules in the business rules engine 226, the media 155, metadata 156-1, and any additional metadata 156-2 and 156-3, as inputs to generate the customized media output 506. The scripting engine 232 generates the script in the form of a description file 504 that is used by the rendering engine 228 (FIG. 2) to generate the customized media output 506. The additional metadata 156-2 and/or 156-3 is parsed and compared with the metadata 156-1. A reference to the additional metadata 156-2 and/or 156-3 is included in the script.

For example, if the scripting engine 232 determines, based on the business rules in the business rules engine 226, that specific media 155 (or 165 in the case of user-added media and metadata) should be included in the customized media output, the scripting engine 232 includes a reference to the specific media 155 (or 165) in the script.

In another embodiment, the scripting engine 232 can utilize the additional metadata 155-2 and/or 155-3 to establish parameters in the customized media output 506. For example, the formatting of the customized website 120, the customized printed book 130 and the customized dynamic story book 140 can be tailored based on metadata identifying groupings of locations (i.e., majority of photos from Magic Kingdom), affinities (i.e., critical mass of photos of a specific character from multiple locations), or simply temporal data (i.e., a layout based on day, or time of day).

While various embodiments of the invention have been described, it will be apparent to those of ordinary skill in the art that many more embodiments and implementations are possible that are within the scope of the invention.

What is claimed is:

1. A method for automating the creation of a customized media product, comprising:
    obtaining media content comprising first metadata associated with the media content, the media content being selected by a user;
    reviewing the media content and the first metadata to determine second metadata to further describe the media content;
    responsive to the reviewing, adding predefined content to the media content, the predefined content added being based on the user selection of the media content;
    applying at least one set of rules to the media content and the predefined content to generate a script; and
    generating the customized media product based on the script.

2. The method of claim 1, further comprising associating additional media content and third metadata to generate the customized media product, the additional media content and the third metadata being user selectable.

3. The method of claim 1, in which the at least one set of rules is predefined.

4. The method of claim 1, in which the at least one set of rules is dynamic.

5. The method of claim 1, in which the customized media product is a customized web page.

6. The method of claim 1, in which the customized media product is customized story book.

7. The method of claim 6, in which the customized story book is dynamic.

8. The method of claim 2, in which the additional media content and third metadata are associated with the media content using an automated process.

9. The method of claim 2, in which the additional media content and third metadata are associated with the media content using a manual process.

10. A method for automating the creation of a customized media product, comprising:
    obtaining media content comprising first metadata associated with the media content, the obtaining comprising capturing the media content at a venue;
    reviewing the media content and the first metadata to determine second metadata to further describe the media content;
    responsive to the reviewing, adding predefined content to the media content, the predefined content added being based on user selection of the media content;
    applying at least one set of rules to the media content and the predefined content to generate a script;
    generating the customized media product based on script.

11. The method of claim 10, further comprising analyzing the media content, the first metadata, the second metadata and the predefined content to determine whether to associate additional media content and third metadata to the media content.

12. The method of claim 11, further comprising associating additional media content and third metadata to the media content to generate the customized media product, the additional media content and the third metadata being user selectable.

13. The method of claim 12, further comprising automatically associating the additional media content and the third metadata with the media content.

14. The method of claim 12, further comprising manually associating the additional media content and the third metadata with the media content.

* * * * *